US012151741B2

(12) United States Patent
Takaku et al.

(10) Patent No.: US 12,151,741 B2
(45) Date of Patent: Nov. 26, 2024

(54) CONTROL DEVICE, CONTROL METHOD, AND COMPUTER- READABLE RECORDING MEDIUM

(71) Applicant: HONDA MOTOR CO., LTD., Tokyo (JP)

(72) Inventors: Hiroki Takaku, Tokyo (JP); Zekun Xiu, Tokyo (JP); Takeshi Sasajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/113,364

(22) Filed: Feb. 23, 2023

(65) Prior Publication Data

US 2023/0303169 A1 Sep. 28, 2023

(30) Foreign Application Priority Data

Mar. 22, 2022 (JP) ................................ 2022-045044

(51) Int. Cl.

*B62D 15/02* (2006.01)
*B60W 30/06* (2006.01)
*G05D 1/00* (2024.01)

(52) U.S. Cl.

CPC ......... *B62D 15/0275* (2013.01); *B60W 30/06* (2013.01); *B62D 15/0285* (2013.01);
(Continued)

(58) Field of Classification Search

CPC ........... B62D 15/0275; B62D 15/0285; B60W 30/06; B60W 2050/146; B60W 50/14;
(Continued)

(56) References Cited

U.S. PATENT DOCUMENTS

2020/0302657 A1 9/2020 Shimazu et al.
2021/0233290 A1 7/2021 Shimazu et al.
(Continued)

FOREIGN PATENT DOCUMENTS

EP 1038734 A1 * 9/2000 ............... B60R 1/00
JP 2005-045602 A 2/2005
(Continued)

OTHER PUBLICATIONS

Dec. 12, 2023, Translation of Japanese Office Action issued for related JP Application No. 2022-045044.

*Primary Examiner* — Daryl C Pope
(74) *Attorney, Agent, or Firm* — Paratus Law Group, PLLC

(57) ABSTRACT

A control device including circuitry configured to: obtain an external environment recognition image representing a recognition result of a surrounding area of a moving body; and display the external environment recognition image on a display device. The circuitry is further configured to: enable displaying of a moving guide representing a predetermined position in a traveling direction of the moving body and a stop guide representing a position where movement of the moving body is to be stopped on the display device in a superimposed manner on the external environment recognition image; and set a transmittance of the moving guide to be higher in a case where the moving guide and the stop guide are superimposed on the external environment recognition image than in a case where only the moving guide among the moving guide and the stop guide is superimposed on the external environment recognition image.

7 Claims, 10 Drawing Sheets

(52) U.S. Cl.
CPC ......... *G05D 1/0016* (2013.01); *G05D 1/0038* (2013.01); *G05D 1/0238* (2013.01)

(58) Field of Classification Search
CPC ........ B60W 2554/20; B60W 2554/802; G05D 1/0016; G05D 1/0038; G05D 1/0238; B60R 1/22; B60R 2300/307; B60K 2360/1438; B60K 2360/171; B60K 2360/176; B60K 2360/178; B60K 2360/179; B60K 35/00; B60K 35/10; B60K 35/20
See application file for complete search history.

(56) References Cited

U.S. PATENT DOCUMENTS

| | | | |
|---|---|---|---|
| 2022/0001813 | A1 | 1/2022 | Matsushita |
| 2023/0154065 | A1 | 5/2023 | Shimazu et al. |

FOREIGN PATENT DOCUMENTS

| | | | |
|---|---|---|---|
| JP | 2007-043530 | A | 2/2007 |
| JP | 2018-098567 | A | 6/2018 |
| JP | 2020-161866 | A | 10/2020 |
| JP | 2021-037894 | A | 3/2021 |

* cited by examiner

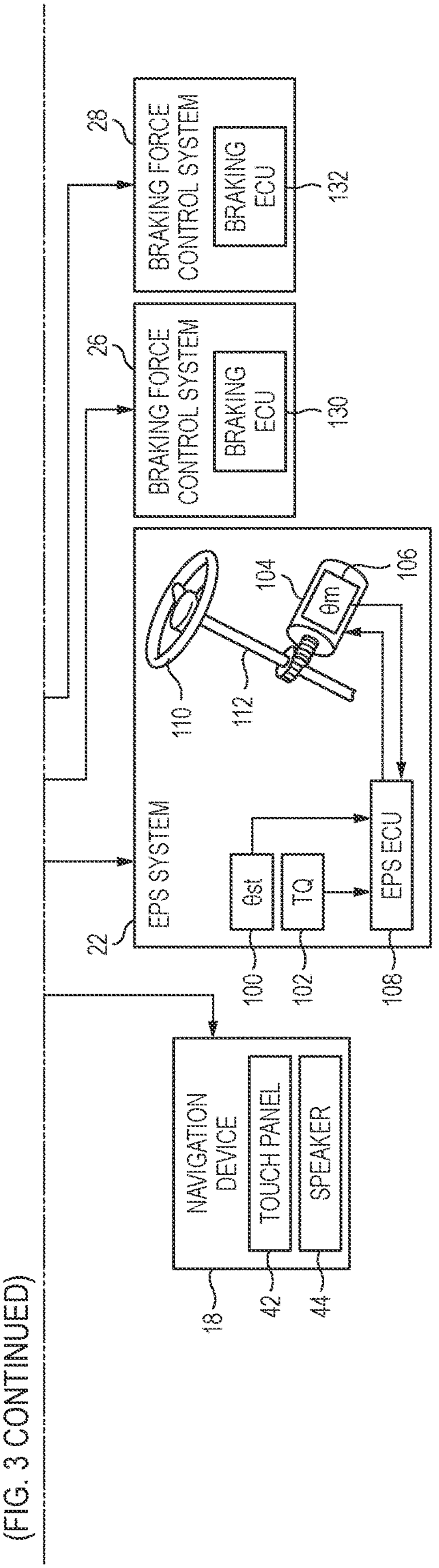
(FIG. 3 CONTINUED)

CONTROL DEVICE, CONTROL METHOD, AND COMPUTER- READABLE RECORDING MEDIUM

CROSS-REFERENCE TO RELATED APPLICATIONS

This application is based on and claims priority under 35 USC 119 from Japanese Patent Application No. 2022-045044 filed on Mar. 22, 2022, the contents of which are incorporated herein by reference.

TECHNICAL FIELD

The present disclosure relates to a control device, a control method, and a computer-readable recording medium storing a control program.

BACKGROUND

In recent years, efforts have been actively made to provide access to sustainable transportation systems in consideration of vulnerable traffic participants. In order to achieve the above-described goal, attention is focused on research and development to further improve safety and convenience of traffic through research and development related to a driving assistance technique.

The related art discloses a technique for displaying an image of a surrounding area of a vehicle captured by an in-vehicle camera or the like on a display device of the vehicle during vehicle movement at the time of parking (at the time of low-speed movement). Japanese Patent Application Laid-Open Publication No. 2007-43530 (hereinafter, referred to as Patent Literature 1) discloses a driving assistance device that draws a travel locus line of a vehicle on a captured image of a surrounding area of the vehicle, and, when the drawn travel locus line and an obstacle present in the image overlap each other in the image, displays a travel locus line of an overlapping portion by a semi-transparent line, for example, such that the travel locus line of the overlapping portion is different from a travel locus line of a non-overlapping portion.

Japanese Patent Application Laid-Open Publication No. 2005-45602 (hereinafter, referred to as Patent Literature 2) discloses a vehicle visual field monitoring system that generates a detection display symbol that appears to stand in a vertical direction from a road surface based on an obstacle detected by a sensor and a movement locus range of a vehicle and displays the detection display symbol in a superimposed manner on an image of a surrounding area of the vehicle.

According to the driving assistance device of Patent Literature 1, the travel locus line of the portion overlapping the obstacle is displayed as the semi-transparent line, and thus it is possible to prevent the travel locus line from appearing raised on the image. According to the vehicle visual field monitoring system of Patent Literature 2, it is possible to make it easy to understand a situation in the surrounding area of the vehicle by displaying the detection display symbol that appears to stand in the vertical direction from the road surface in a superimposed manner on the image. In this way, in driving assistance techniques, various display modes are proposed for displaying an image for guiding travel of a vehicle, but there is room for further improvement in a desirable display mode.

The present disclosure provides a control device, a control method, and a computer-readable recording medium storing a control program which enable to improve visibility of a guide image for guiding travel of a vehicle. This contributes to development of a sustainable transportation system.

SUMMARY

A first aspect of the present disclosure relates to a control device including circuitry configured to:

obtain an external environment recognition image representing a recognition result of a surrounding area of a moving body; and display the external environment recognition image on a display device, in which the circuitry is further configured to:

enable displaying of a moving guide representing a predetermined position in a traveling direction of the moving body and a stop guide representing a position where movement of the moving body is to be stopped on the display device in a superimposed manner on the external environment recognition image; and set a transmittance of the moving guide to be higher in a case where the moving guide and the stop guide are superimposed on the external environment recognition image than in a case where only the moving guide among the moving guide and the stop guide is superimposed on the external environment recognition image.

A second aspect of the present disclosure relates to a control method performed by a control device, the control method including:

obtaining an external environment recognition image representing a recognition result of a surrounding area of a moving body, and displaying the external environment recognition image on a display device, in which the control method further includes:

enabling displaying of a moving guide representing a predetermined position in a traveling direction of the moving body and a stop guide representing a position where movement of the moving body is to be stopped on the display device in a superimposed manner on the external environment recognition image; and setting a transmittance of the moving guide to be higher in a case where the moving guide and the stop guide are superimposed on the external environment recognition image than in a case where only the moving guide among the moving guide and the stop guide is superimposed on the external environment recognition image.

A third aspect of the present disclosure relates to a non-transitory computer-readable recording medium storing a control program for causing a processor of a control device to execute processing, the processing including:

obtaining an external environment recognition image representing a recognition result of a surrounding area of a moving body; and displaying the external environment recognition image on a display device, in which the processing further includes:

enabling displaying of a moving guide representing a predetermined position in a traveling direction of the moving body and a stop guide representing a position where movement of the moving body is to be stopped on the display device in a superimposed manner on the external environment recognition image; and setting a transmittance of the moving guide to be higher in a case where the moving guide and the stop guide are superimposed on the external environment recognition image than in a case where only the moving guide among the moving guide and the stop guide is superimposed on the external environment recognition image.

According to the present disclosure, it is possible to provide a control device, a control method, and a control program which enable to improve visibility of a guide image for guiding travel of a vehicle.

BRIEF DESCRIPTION OF DRAWINGS

Exemplary embodiment(s) of the present disclosure will be described in detail based on the following figures, wherein.

DESCRIPTION OF EMBODIMENTS

Figure 1:
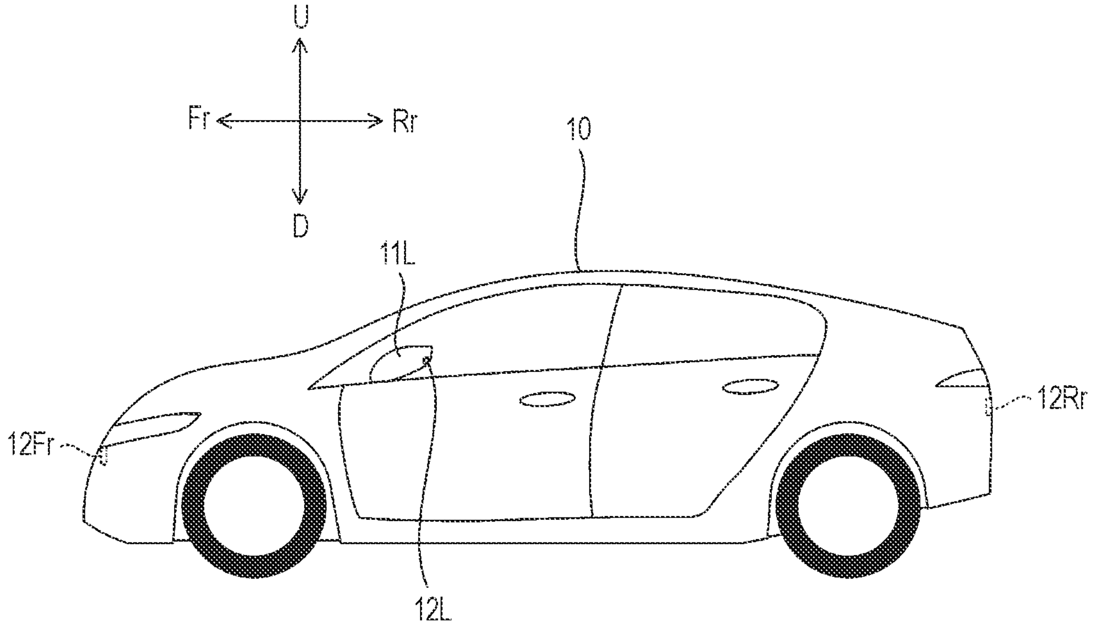
FIG. 1 is a side view showing an example of a vehicle whose movement is controlled by a control device according to an embodiment.

Hereinafter, an embodiment of a control device, a control method, and a computer-readable recording medium storing a control program according to the present disclosure will be described with reference to the accompanying drawings. The drawings are viewed in directions of reference signs. In addition, in the present specification and the like, in order to simplify and clarify the description, a front-rear direction, a left-right direction, and an up-down direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Control Device According to Present Disclosure>

Figure 2:
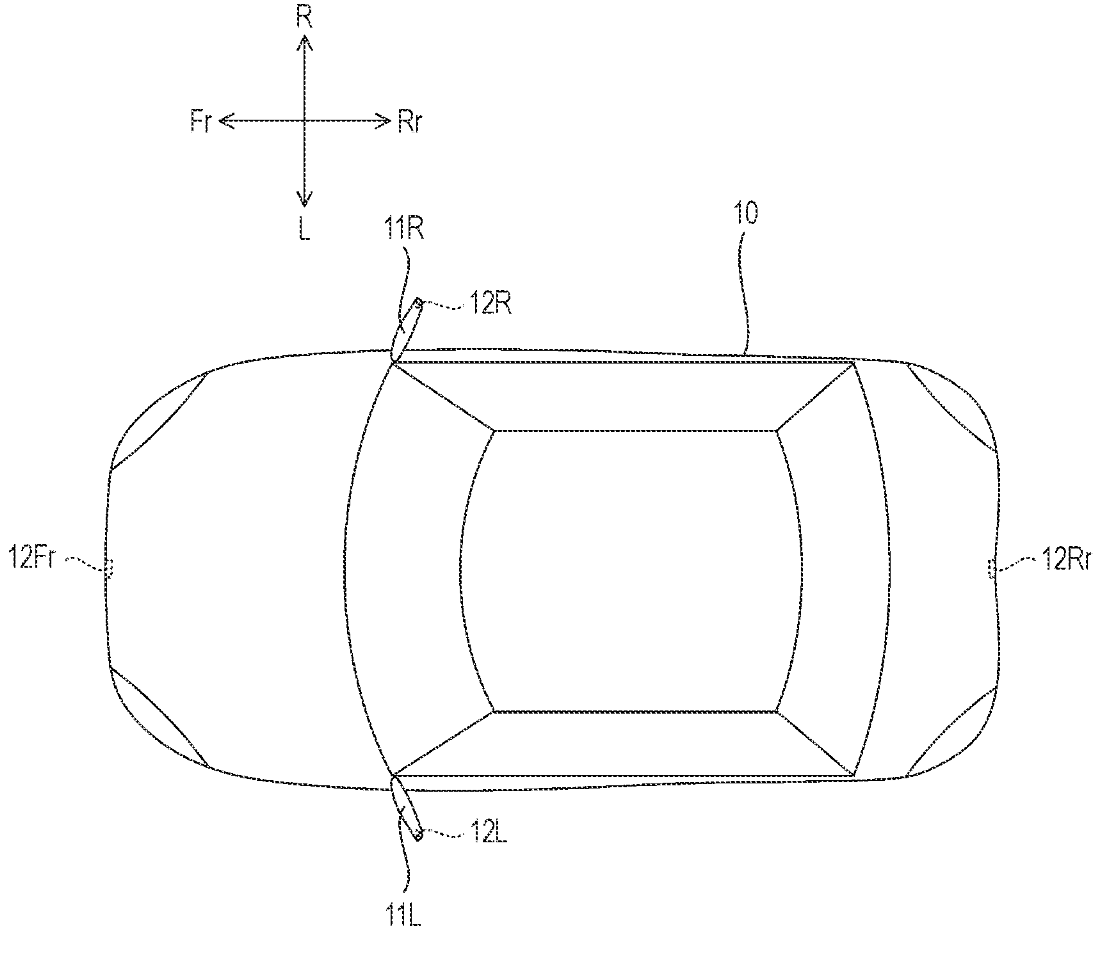
FIG. 2 is a top view of the vehicle shown in FIG. 1.

FIG. 1 is a side view of the vehicle 10 whose movement is controlled by the control device according to the invention. FIG. 2 is a top view of the vehicle 10 shown in FIG. 1. The vehicle 10 is an example of a moving body in the invention.

The vehicle 10 is an automobile including a drive source (not shown) and wheels including driving wheels driven by power of the drive source and steering wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may also be an internal combustion engine such as a gasoline engine or a diesel engine, or a combination of an electric motor and an internal combustion engine. In addition, the drive source of the vehicle 10 may drive the pair of left and right front wheels, the pair of left and right rear wheels, or four wheels, that is, the pair of left and right front wheels and the pair of left and right rear wheels. The front wheels and the rear wheels may both be steering wheels that are steerable, or one of the front wheels and the rear wheels may be steering wheels that are steerable.

The vehicle 10 further includes side mirrors 11L and 11R. The side mirrors 11L and 11R are mirrors (rearview mirrors) that are provided outside front seat doors of the vehicle 10 for the driver to check a rear side and a rear lateral side. Each of the side mirrors 11L and 11R is fixed to a body of the vehicle 10 by a rotation shaft extending in a vertical direction and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of a front side of the vehicle 10. The rear camera 12Rr is a digital camera that is provided at a rear portion of the vehicle 10 and captures an image of a rear side of the vehicle 10. The left side camera 12L is a digital camera that is provided on the left side mirror 11L of the vehicle 10 and captures an image of a left side of the vehicle 10. The right side camera 12R is a digital camera that is provided on the right side mirror 11R of the vehicle 10 and captures an image of a right side of the vehicle 10.

<Internal Configuration of Vehicle 10>

Figure 3:
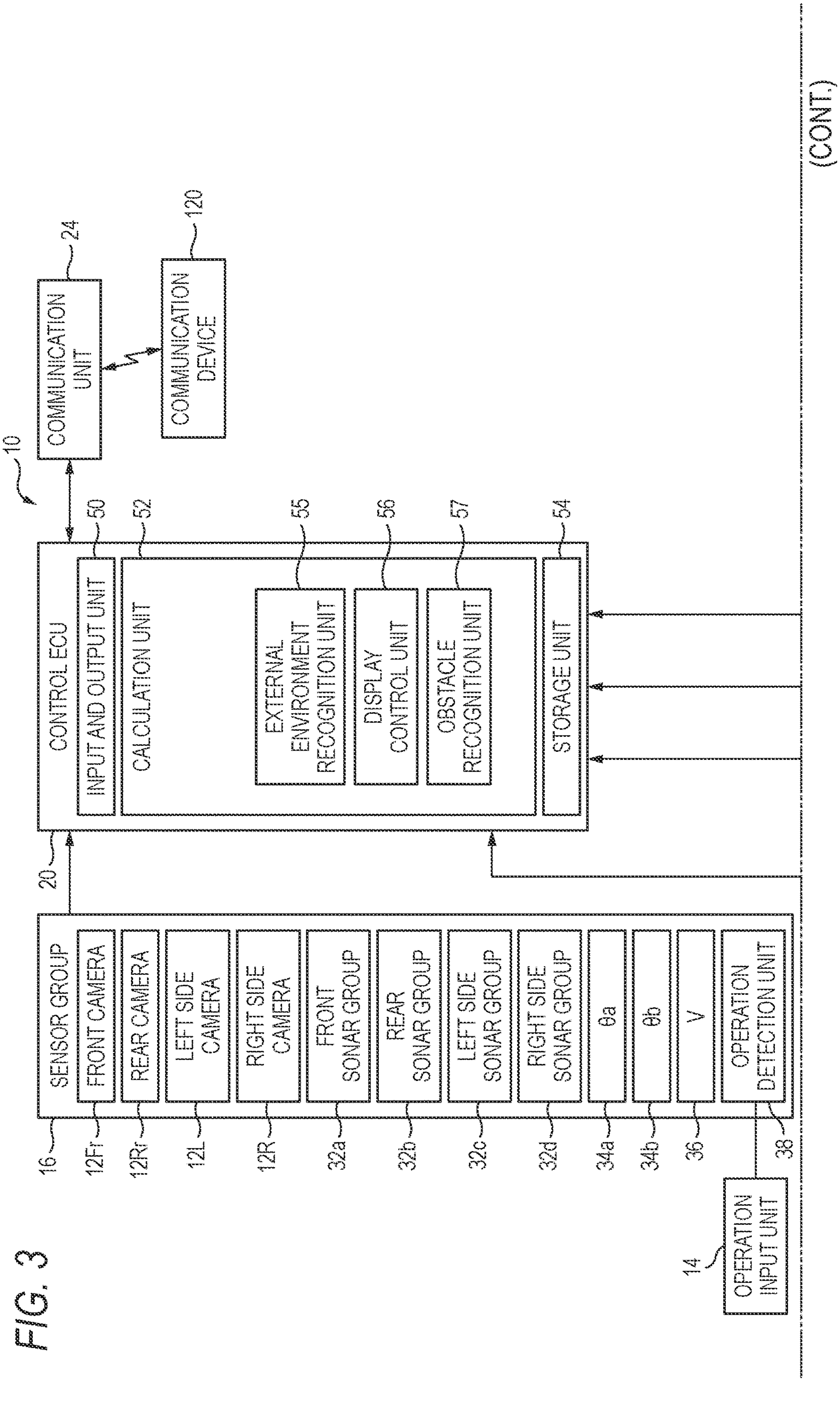
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 obtains various detection values used for control performed by the control ECU 20. The sensor group 16 includes the front camera 12Fr, the rear camera 12Rr, the left side camera 12L, and the right side camera 12R. In addition, the sensor group 16 includes a front sonar group 32*a*, a rear sonar group 32*b*, a left side sonar group 32*c*, and a right side sonar group 32*d*. In addition, the sensor group 16 includes wheel sensors 34*a* and 34*b*, a vehicle speed sensor 36, and an operation detection unit 38. The sensor group 16 may include a radar.

The front camera 12Fr, the rear camera 12Rr, the left side camera 12L, and the right side camera 12R obtain recognition data (for example, an external environment recognition image) for recognizing a surrounding area of the vehicle 10 by capturing images of the surrounding area of the vehicle 10. An external environment recognition image captured by the front camera 12Fr is referred to as a front recognition image. An external environment recognition image captured by the rear camera 12Rr is referred to as a rear recognition image. An external environment recognition image captured by the left side camera 12L is referred to as a left side recognition image. An external environment recognition image captured by the right side camera 12R is referred to as a right side recognition image. An image formed by the left side recognition image and the right side recognition image may be referred to as a side recognition image. An external environment recognition image generated by synthesizing imaging data of the front camera 12Fr, the rear camera 12Rr, the left side camera 12L, and the right side camera 12R may be referred to as a top view image of the vehicle 10.

The front sonar group 32*a*, the rear sonar group 32*b*, the left side sonar group 32*c*, and the right side sonar group 32*d* emit sound waves to the surrounding area of the vehicle 10 and receive reflected sounds from other objects. The front sonar group 32*a* includes, for example, four sonars. The sonars constituting the front sonar group 32*a* are respectively provided on an obliquely left front side, a front left side, a front right side, and an obliquely right front side of the vehicle 10. The rear sonar group 32*b* includes, for example, four sonars. The sonars constituting the rear sonar group 32*b* are respectively provided on an obliquely left rear side, a rear left side, a rear right side, and an obliquely right rear side of the vehicle 10. The left side sonar group 32*c* includes, for example, two sonars. The sonars constituting the left side sonar group 32*c* are provided in the front of a left side portion of the vehicle 10 and the rear of the left side portion, respectively. The right side sonar group 32*d* includes, for example, two sonars. The sonars constituting the right side sonar group 32*d* are provided in the front of a right side portion of the vehicle 10 and the rear of the right side portion, respectively.

The wheel sensors 34*a* and 34*b* detect a rotation angle of the wheel of the vehicle 10. The wheel sensors 34*a* and 34*b* may be implemented by angle sensors or displacement sensors. The wheel sensors 34*a* and 34*b* output detection pulses each time the wheel rotates by a predetermined angle. Detection pulses output from the wheel sensors 34*a* and 34*b* are used to calculate the rotation angle of the wheel and a rotation speed of the wheel. A movement distance of the vehicle 10 is calculated based on the rotation angle of the wheel. The wheel sensor 34*a* detects, for example, a rotation angle $\theta a$ of the left rear wheel. The wheel sensor 34*b* detects, for example, a rotation angle $\theta b$ of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14 and outputs the detected content of the operation to the control ECU 20. The operation input unit 14 includes, for example, various user interfaces such as a side mirror switch that switches opened and closed states of the side mirrors 11L and 11R, and a shift lever (a select lever or a selector).

The navigation device 18 detects a current position of the vehicle 10 by using, for example, a global positioning system (GPS), and guides the user along a route toward a destination. The navigation device 18 includes a storage device (not shown) that includes a map information database.

The navigation device 18 includes a touch panel 42 and a speaker 44. The touch panel 42 functions as an input device and a display device of the control ECU 20. The speaker 44 outputs various types of guidance information to the user of the vehicle 10 by voice.

The touch panel 42 is configured to input various commands to the control ECU 20. For example, the user can input a command via the touch panel 42 to display the external environment recognition image of the vehicle 10. In addition, the touch panel 42 is configured to display various screens related to a control content of the control ECU 20. For example, the external environment recognition image of the vehicle 10 is displayed on the touch panel 42. Constituent elements other than the touch panel 42, for example, a head-up display (HUD), a smartphone, or a tablet terminal may be used as the input device or the display device.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. In addition, the calculation unit 52 receives and outputs signals from and to each unit connected to the control ECU 20 via the input and output unit 50.

The calculation unit 52 includes an external environment recognition unit 55 that recognizes the external environment recognition image, a display control unit 56 that controls display of the external environment recognition image, and an obstacle recognition unit 57 that recognizes an obstacle in the surrounding area of the vehicle 10. The calculation unit 52 is an example of a control device in the invention.

The external environment recognition unit 55 obtains, from each camera, the external environment recognition image representing a recognition result of a peripheral image of the vehicle 10 captured by the front camera 12Fr, the rear camera 12Rr, the left side camera 12L, and the right side camera 12R.

The display control unit 56 displays the external environment recognition image obtained by the external environment recognition unit 55 on a display device of the vehicle 10. Specifically, the display control unit 56 displays, on the touch panel 42, the front recognition image captured by the front camera 12Fr, the rear recognition image captured by the rear camera 12Rr, the left side recognition image captured by the left side camera 12L, and the right side recognition image captured by the right side camera 12R. In addition, the display control unit 56 displays, on the touch panel 42, the top view image of the vehicle 10 generated by synthesizing the imaging data of the front camera 12Fr, the rear camera 12Rr, the left side camera 12L, and the right side camera 12R.

In addition, the display control unit 56 displays, on the touch panel 42, a moving guide representing a predetermined position in a traveling direction of the vehicle 10 and a stop guide representing a position where movement of the vehicle 10 needs to be stopped in a superimposed manner on the external environment recognition image. The moving guide is, for example, a guide representing a width of the vehicle 10, or a front end and a rear end of the vehicle 10. The moving guide is a guide that is constantly fixed and displayed at a certain distance from the vehicle 10. The fixed position where the moving guide is displayed may be changed according to a travel speed of the vehicle 10. Specifically, the predetermined distance from the vehicle 10 may be increased as the travel speed increases. The stop guide is, for example, a guide representing that the vehicle 10 needs to stop, that is, a guide for warning that the vehicle 10 approaches an obstacle, and is displayed as a vertical signboard, for example. The stop guide has transparency. The moving guide and the stop guide are displayed as guides of different colors.

According to a predetermined condition, the display control unit 56 changes display transmittances of the moving guide and the stop guide to be superimposed on the external environment recognition image and displayed. For example, the display control unit 56 sets the transmittance of the moving guide in a case where both the moving guide and the stop guide are superimposed on the external environment recognition image to be higher than the transmittance of the moving guide in a case where only the moving guide among the moving guide and the stop guide is superimposed on the external environment recognition image. In addition, for example, in the case where both the moving guide and the stop guide are superimposed on the external environment recognition image, the display control unit 56 sets the transmittance of the moving guide in an area in which the moving guide and the stop guide are displayed in an overlapping manner to be higher than the transmittance of the moving guide in an area in which the moving guide and the stop guide are not displayed in an overlapping manner. In addition, when the moving guide and the stop guide are displayed in a superimposed manner on the external environment recognition image, the display control unit 56 displays the transmittance of the moving guide with a transmittance selected by the user.

In addition, for example, when a predetermined instruction operation using the touch panel 42 for displaying the external environment recognition image or a predetermined instruction operation using a switch or the like is performed by the user of the vehicle 10, the display control unit 56 displays the moving guide in a superimposed manner on the external environment recognition image. In addition, for example, when the travel speed of the vehicle 10 is 15 km/h or less, or when the vehicle 10 is suddenly decelerated, the display control unit 56 displays the moving guide in a superimposed manner on the external environment recognition image. In addition, for example, the display control unit 56 displays the moving guide in a superimposed manner on the external environment recognition image when it is determined that the vehicle 10 is in a parking lot or is about to be parked based on current position information on the vehicle 10 obtained by the GPS or the external environment recognition image captured by the camera. In addition, when a distance between the vehicle 10 and an obstacle detected in a surrounding area of the vehicle 10 is equal to or less than a predetermined distance, the display control unit 56 displays the stop guide in a superimposed manner on the external environment recognition image.

The obstacle recognition unit 57 recognizes an obstacle in the surrounding area of the vehicle 10. For example, when the vehicle 10 is parked, the obstacle recognition unit 57 recognizes whether there is any obstacle in a surrounding area at a target parking position of the vehicle 10, or when the vehicle 10 exits a parking space, the obstacle recognition unit 57 recognizes whether there is any obstacle in a surrounding area at a current parking position of the vehicle 10. Examples of the obstacle include an object that interferes with traveling of the vehicle 10, such as a wall, a pillar, another vehicle, and a person. Examples of the obstacle recognition unit 57 include the sonar groups 32*a* to 32*d*, cameras 12Fr, 12Rr, 12L, and 12R, and LiDAR.

The EPS system 22 includes a steering angle sensor 100, a torque sensor 102, an EPS motor 104, a resolver 106, and an EPS ECU 108. The steering angle sensor 100 detects a steering angle θst of a steering wheel 110. The torque sensor 102 detects a torque TQ applied to the steering wheel 110.

The EPS motor 104 applies a driving force or a reaction force to a steering column 112 connected to the steering wheel 110, thereby enabling assistance of an operation performed by an occupant on the steering wheel 110 and enabling autonomous steering during parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, a smartphone or a tablet terminal carried by the user of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed on an accelerator pedal (not shown) by the user.

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed on a brake pedal (not shown) by the user.

<Processing Performed by Calculation Unit 52>

Figure 4:
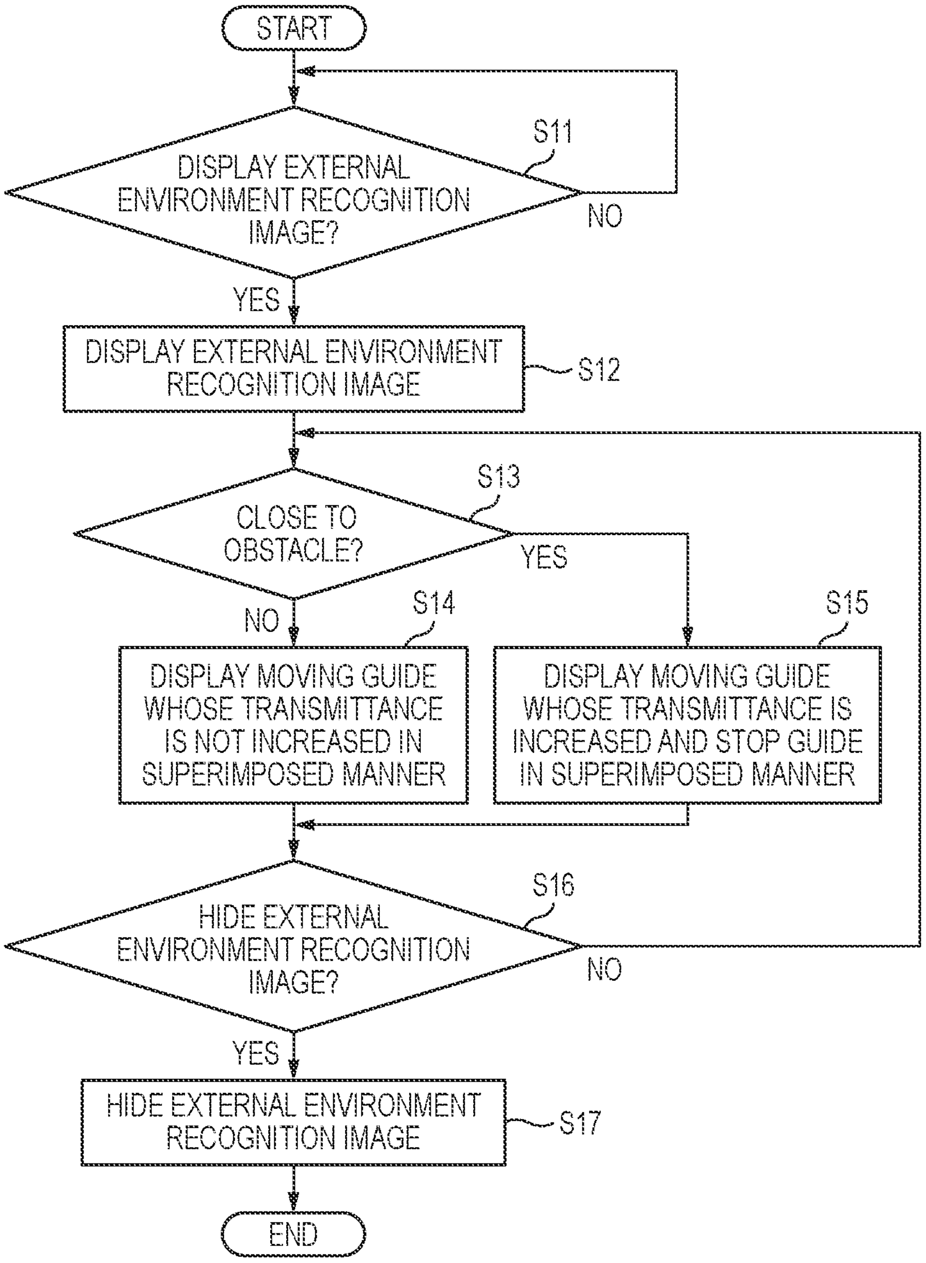
FIG. 4 is a flow chart showing an example of processing performed by a calculation unit.

Next, an example of processing for displaying the moving guide and the stop guide performed by the calculation unit 52 of the vehicle 10 will be described with reference to a flow chart shown in FIG. 4.

For example, the user who drives the vehicle 10 attempts to park the vehicle 10 in a parking space in a parking lot. For example, it is assumed that the vehicle 10 is traveling at a low speed (for example, 15 km/h or less) or is stopped. For example, when the traveling state of the vehicle 10 is detected based on a detection value of the vehicle speed sensor 36, the calculation unit 52 of the vehicle 10 starts processing shown in FIG. 4.

The display control unit 56 of the calculation unit 52 determines whether to display the external environment recognition image obtained by the external environment recognition unit 55 on the touch panel 42 of the navigation device 18 (step S11). The external environment recognition image is displayed, for example, when a parking button (not shown) displayed on the touch panel 42 is tapped. Therefore, for example, the display control unit 56 determines whether the parking button is tapped by the user.

In step S11, when the external environment recognition image is not to be displayed on the touch panel 42, that is, when the parking button is not tapped (step S11: No), the display control unit 56 repeats the process of step S11 and stands by until the parking button is tapped.

In step S11, when the external environment recognition image is to be displayed on the touch panel 42, that is, when the parking button is tapped (step S11: Yes), the display control unit 56 displays the external environment recognition image on the touch panel 42 (step S12). For example, when a gear of the vehicle 10 is set to reverse, the display control unit 56 displays the rear recognition image captured by the rear camera 12Rr on the touch panel 42. In addition, when the gear of the vehicle 10 is set to drive, neutral, or parking, the display control unit 56 displays the front recognition image captured by the front camera 12Fr on the touch panel 42.

Next, the display control unit 56 determines whether the vehicle 10 is close to the obstacle (step S13). As described above, the obstacle in the surrounding area of the vehicle 10 is recognized by the obstacle recognition unit 57. As an example, the term "close to an obstacle" means that a distance between the front end and the rear end of the vehicle 10 and an obstacle in the surrounding area of the vehicle 10 is 1 m or less.

In step S13, when the vehicle 10 is not close to the obstacle (step S13: No), the display control unit 56 displays only the moving guide whose transmittance is not increased (transmittance is low) on the touch panel 42 in a superimposed manner on the external environment recognition image (step S14). The moving guide whose transmittance is not increased is, for example, a moving guide having a transmittance of 0%, and is a guide in a state in which an opposite side cannot be seen through the moving guide. Therefore, when the moving guide is superimposed on the external environment recognition image, the external environment recognition image of a portion where the moving guide overlaps is hidden by the moving guide. The user parks the vehicle 10 in a target parking space while referring to the external environment recognition image displayed on the touch panel 42 and the moving guide superimposed on the external environment recognition image.

In step S13, when the vehicle 10 is close to the obstacle (step S13: Yes), the display control unit 56 displays both the moving guide whose transmittance is increased (transmittance is high) and the stop guide on the touch panel 42 in a superimposed manner on the external environment recognition image (step S15). The display control unit 56 superimposes the moving guide and the stop guide in such an order that the stop guide is first superimposed on the external environment recognition image, and then the moving guide is superimposed on the stop guide. The display control unit 56 increases the transmittance of the moving guide in an area in which the moving guide and the stop guide are displayed in an overlapping manner and does not increase the transmittance of the moving guide in an area in which the moving guide and the stop guide do not overlap each other in the moving guide and the stop guide superimposed on the external environment recognition image. For example, the transmittance of the moving guide in the area in which the moving guide and the stop guide are displayed in an overlapping manner is set to 50%, and the transmittance of the moving guide in the area in which the moving guide and the stop guide do not overlap each other is set to 0% (opaque). Therefore, for example, it is possible to view the external environment recognition image on an opposite side (back side) through the moving guide and the stop guide superimposed on the external environment recognition image. The user parks the vehicle 10 in the target parking space while referring to the external environment recognition image displayed on the touch panel 42 and the moving guide and the stop guide superimposed on the external environment recognition image.

After the moving guide is displayed in a superimposed manner in step S14 and after the moving guide and the stop guide are displayed in a superimposed manner in step S15, the display control unit 56 determines whether the external environment recognition image displayed on the touch panel 42 is to be hidden (step S16). The external environment recognition image is hidden, for example, when an end button (not shown) displayed on the touch panel 42 is tapped, or when the vehicle 10 stops parking movement. Therefore, for example, the display control unit 56 determines whether the end button is tapped by the user, or whether the parking movement is stopped.

In step S16, when the external environment recognition image is not to be hidden, that is, when the end button is not tapped (step S16: No), the display control unit 56 returns to step S13 and repeatedly executes processing of each step.

In step S16, when the external environment recognition image is to be hidden, that is, when the end button is tapped (step S16: Yes), the display control unit 56 hides the external environment recognition image from the touch panel 42 (step S17), and ends the present display processing.

<Guide Display Performed by Display Control Unit 56>

Next, an example of the moving guide and the stop guide displayed on the touch panel 42 by the display control unit 56 will be described with reference to FIGS. 5 to 10.

<First Display Mode>

Figure 5:
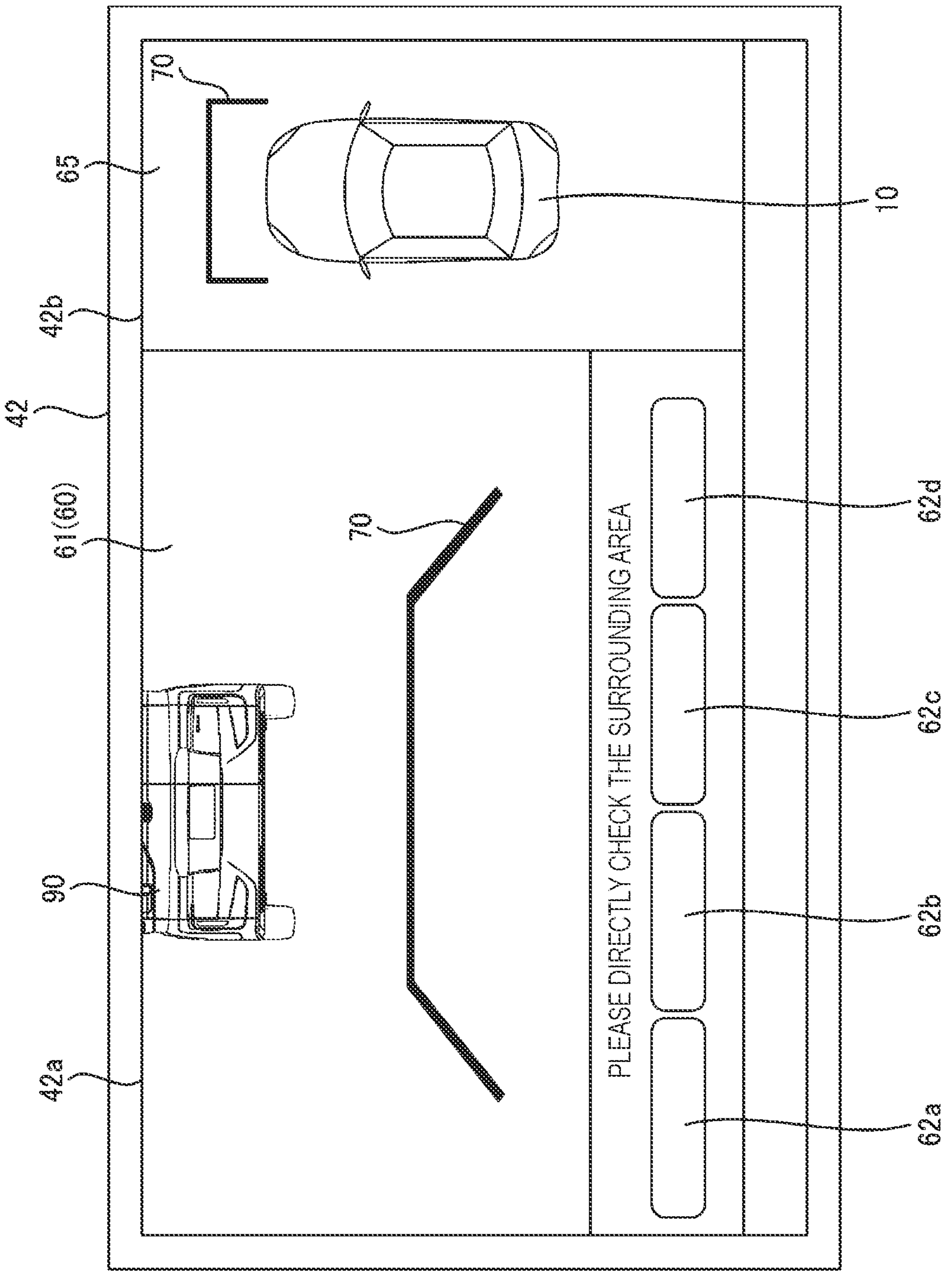
FIG. 5 shows an example of a moving guide displayed on a touch panel of the vehicle.

FIG. 5 shows a display mode of a moving guide 70 displayed in a superimposed manner on a front recognition image 61 (an external environment recognition image 60) and a top view image 65 in a state in which another vehicle 90 (obstacle) is stopped in the front and a distance between the other vehicle 90 and the host vehicle 10 is still equal to or larger than a certain distance when the vehicle 10 is parked parallelly. It is assumed that the gear of the vehicle 10 is in a drive state.

As shown in FIG. 5, the display control unit 56 generates, for example, a first display area 42*a* and a second display area 42*b* on the touch panel 42. The display control unit 56 displays the front recognition image 61 captured by the front camera 12Fr and the moving guide 70 superimposed on the front recognition image 61 in the first display area 42*a*. The front recognition image 61 includes an image of the other vehicle 90 that stops in front of the vehicle 10. In addition, the display control unit 56 displays viewpoint switching buttons 62*a* to 62*d* for switching types (the front recognition image, the rear recognition image, the left side recognition image, and the right side recognition image) of the external environment recognition image 60 displayed in the first display area 42*a*, for example, on a lower side of the first display area 42*a*. The display control unit 56 displays, in the second display area 42*b*, the top view image 65 of the surrounding area of the vehicle 10 generated based on captured images of the front camera 12Fr, the rear camera 12Rr, the left side camera 12L, and the right side camera 12R, and the moving guide 70 superimposed on the top view image 65.

Since the other vehicle 90 is still far from the vehicle 10 as shown in the first display area 42*a*, the other vehicle 90 is not displayed in the second display area 42*b*. In addition, since the other vehicle 90 is still far from the vehicle 10, only the moving guide 70 is displayed in a superimposed manner on the front recognition image 61 and the top view image 65, and the stop guide is not displayed. As described above, the moving guide 70 is a guide representing the width of the vehicle 10 and the front end of the vehicle 10 and is constantly fixed and displayed at a certain distance from the vehicle 10.

Figure 6:
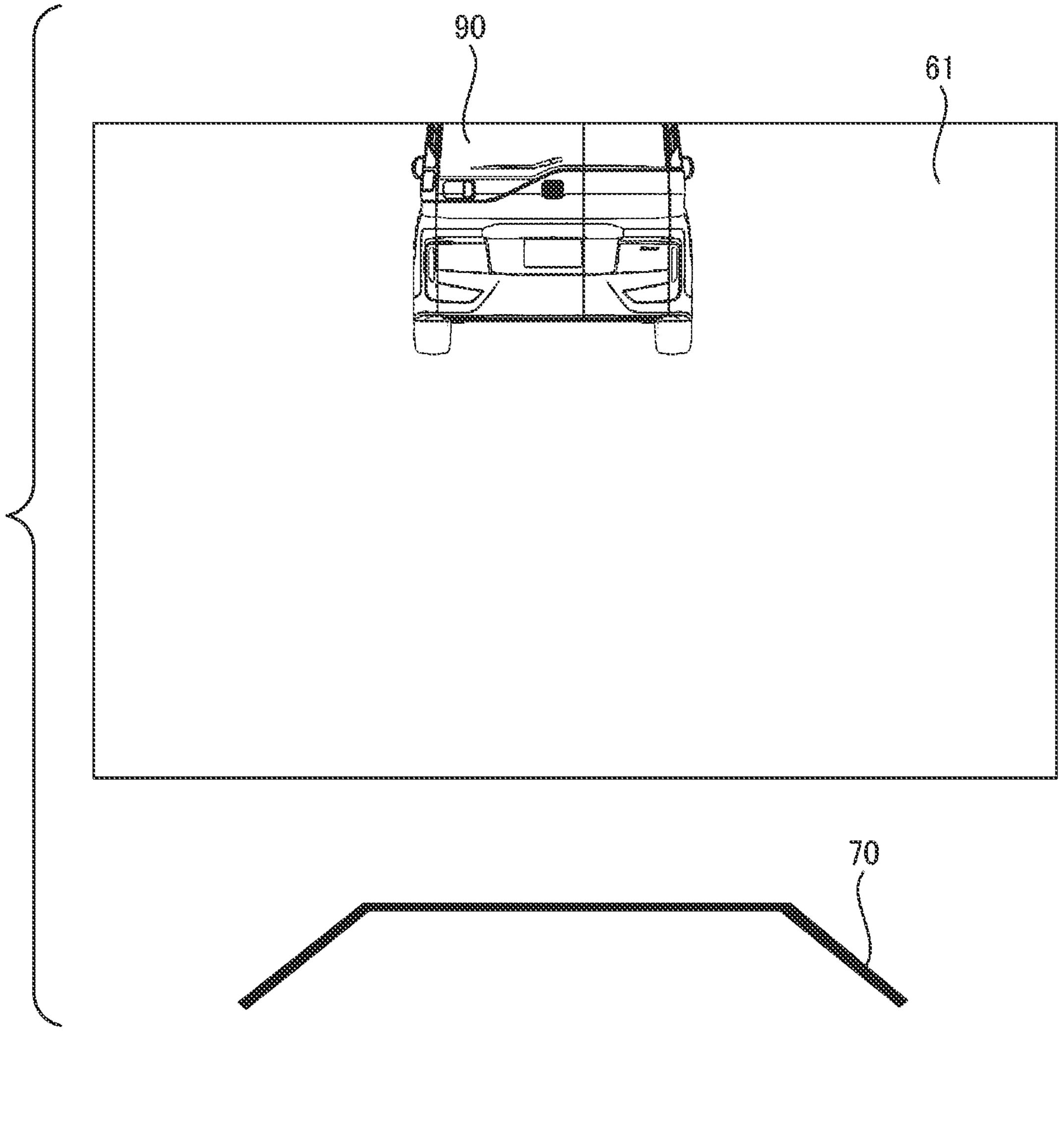
FIG. 6 is a diagram in which a front recognition image and the moving guide displayed in FIG. 5 are separately displayed.

FIG. 6 is a diagram in which the front recognition image 61 and the moving guide 70 displayed in the first display area 42*a* in FIG. 5 are separately displayed. As shown in FIG. 6, when only the moving guide 70 is displayed in a superimposed manner on the front recognition image 61, the display control unit 56 displays the moving guide 70 with a low transmittance (for example, a transmittance of 0%). Accordingly, it is easy to recognize a position of the moving guide 70 displayed in a superimposed manner on the front recognition image 61 and the top view image 65. The moving guide 70 in FIGS. 5 and 6 corresponds to the moving guide displayed in a superimposed manner in step S14 in FIG. 4.

<Display Mode in Related Art>

Figure 7:
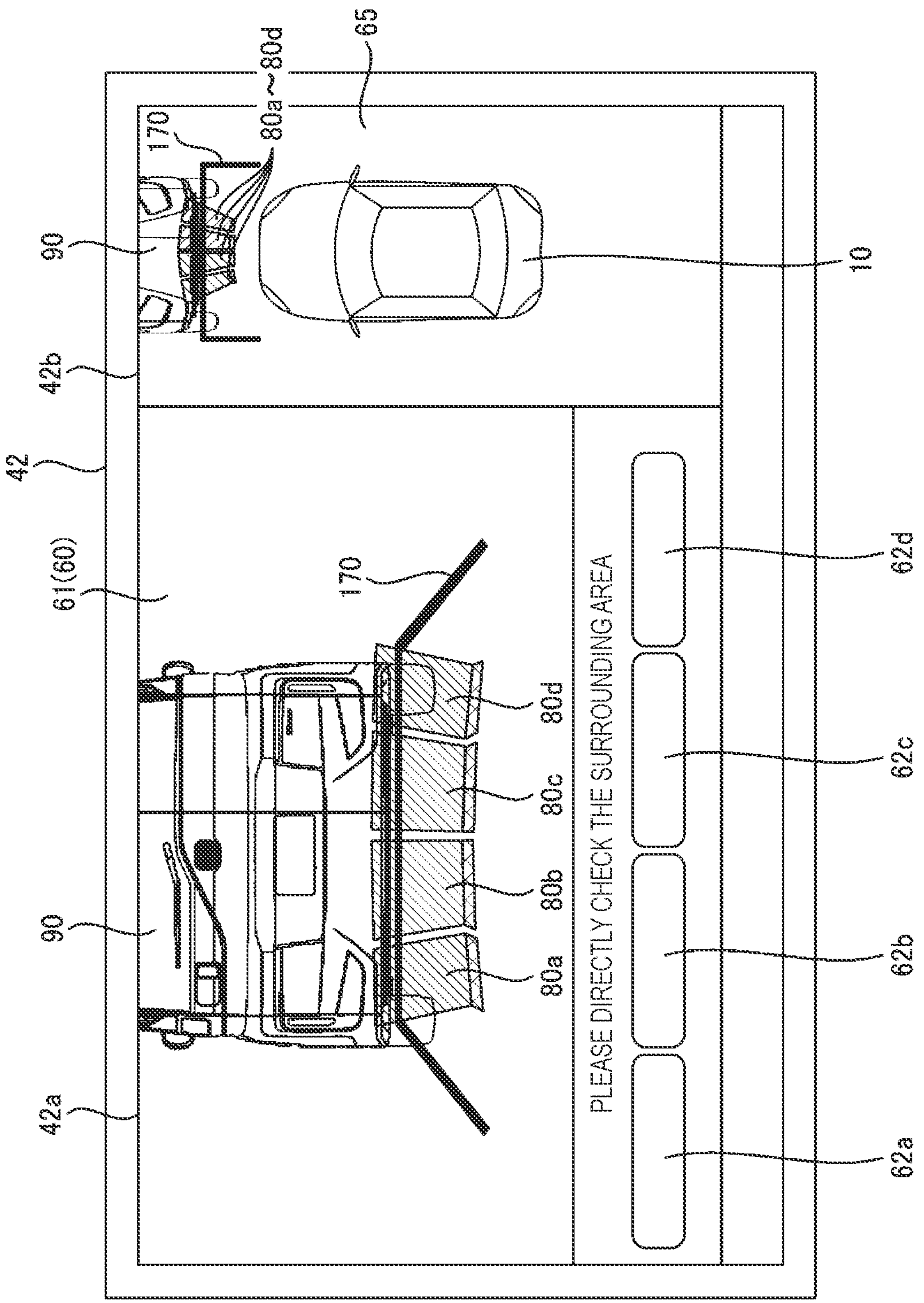
FIG. 7 shows a display mode in the related art of a moving guide and a stop guide displayed on a touch panel of a vehicle.

FIG. 7 shows a display mode in the related art of the moving guide and the stop guide displayed in a superimposed manner on the front recognition image 61 (the external environment recognition image 60) and the top view image 65 when the distance between the vehicle 10 and the other vehicle 90 is less than a certain distance. A display mode of the guide when the distance between the vehicle 10 and the other vehicle 90 is equal to or larger than a certain distance is the same as the display mode shown in FIG. 5 in the case of the related art.

As shown in FIG. 7, when the distance between the vehicle 10 and the other vehicle 90 is less than a certain distance, a display control unit in the related art (hereinafter, referred to as a "control unit in the related art") displays a moving guide 170 and, for example, four stop guides 80*a* to 80*d* in a superimposed manner on the front recognition image 61 and the top view image 65. The stop guides 80*a* to 80*d* are displayed corresponding to a position of the other vehicle 90 and are displayed in a state of overlapping a part of the moving guide 170. As described above, the stop guides 80*a* to 80*d* are guides representing that the vehicle 10 needs to stop, that is, guides for warning that the vehicle 10 approaches an obstacle, and are displayed as four vertical signboards arranged in parallel in a horizontal direction.

At this time, in the case of the display mode in the related art shown in FIG. 7, the control unit in the related art displays the moving guide 170 in the same manner as in the case of the moving guide 70 shown in FIG. 5. That is, the control unit in the related art displays the moving guide 170 with a uniformly low transmittance (for example, a transmittance of 0%).

Figure 8:
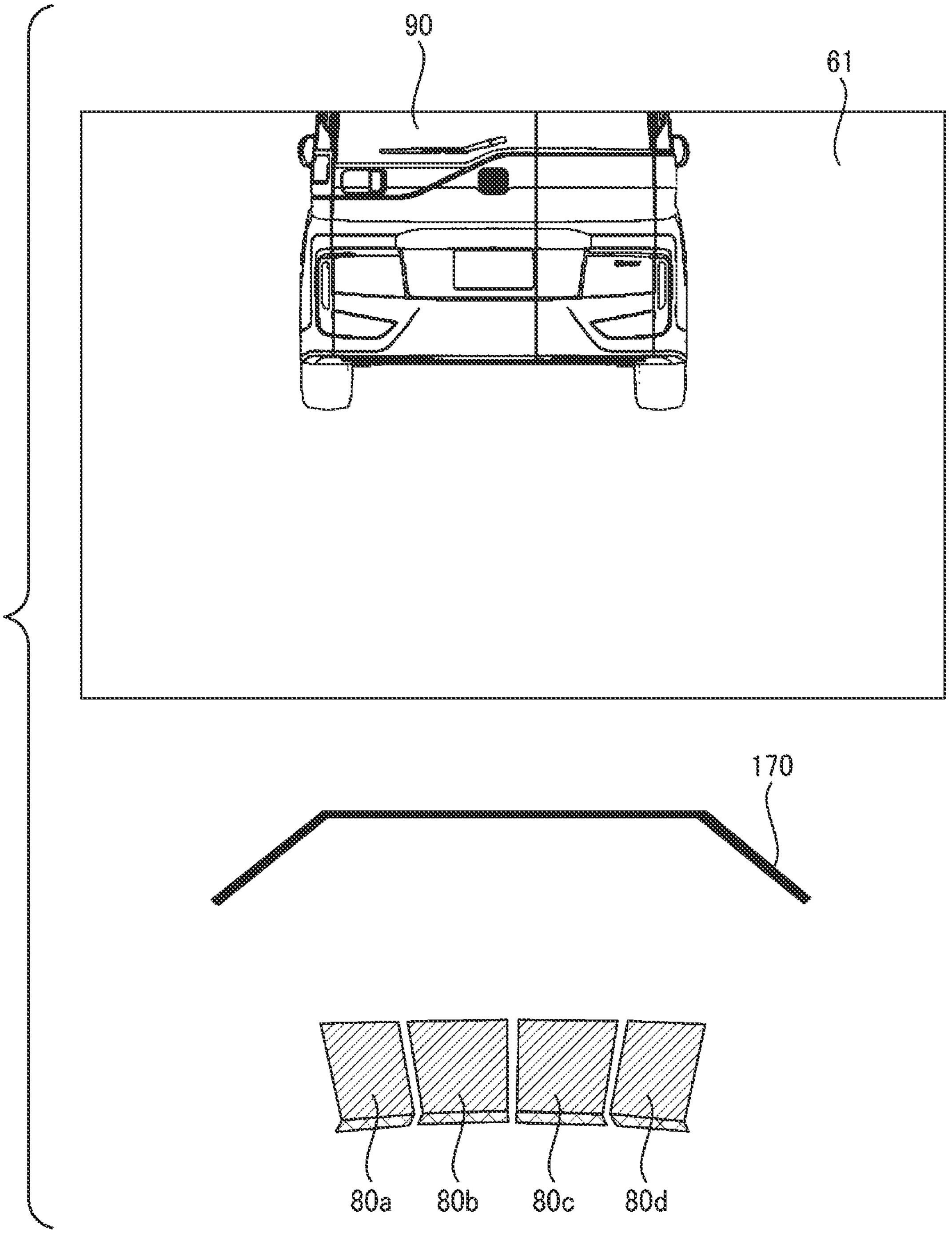
FIG. 8 is a diagram in which a front recognition image, the moving guide, and the stop guide displayed in FIG. 7 are separately displayed.

FIG. 8 is a diagram in which the front recognition image 61, the moving guide 170, and the stop guides 80*a* to 80*d* displayed in the first display area 42*a* in FIG. 7 are separately displayed. As shown in FIG. 8, even when both the moving guide 170 and the stop guides 80*a* to 80*d* are displayed in a superimposed manner on the front recognition image 61, the control unit in the related art displays the moving guide 170 as an opaque guide having a transmittance of 0% as a whole in the same manner as the moving guide 70 shown in FIG. 5.

Accordingly, when the stop guides 80*a* to 80*d* are disposed on a front side (the other vehicle 90 side) of the moving guide 170, areas of the stop guides 80*a* to 80*d* overlapping the moving guide 170 are hidden by the moving guide 170 and cannot be viewed. In addition, when the moving guide 170 overlaps the other vehicle 90, an area where the moving guide 170 overlaps is hidden by the moving guide 170 and cannot be viewed.

Therefore, in the case of the display mode in the related art shown in FIG. 7, when the user views the touch panel 42, the moving guide 170 displayed in a superimposed manner on the front recognition image 61 and the top view image 65 may appear as an unnatural image as if the moving guide 170 is floating in the air.

Therefore, in order to prevent the unnatural appearance of the moving guide 170, the inventors of the present disclosure have considered displaying the moving guide in the following second display mode.

<Second Display Mode>

Figure 9:
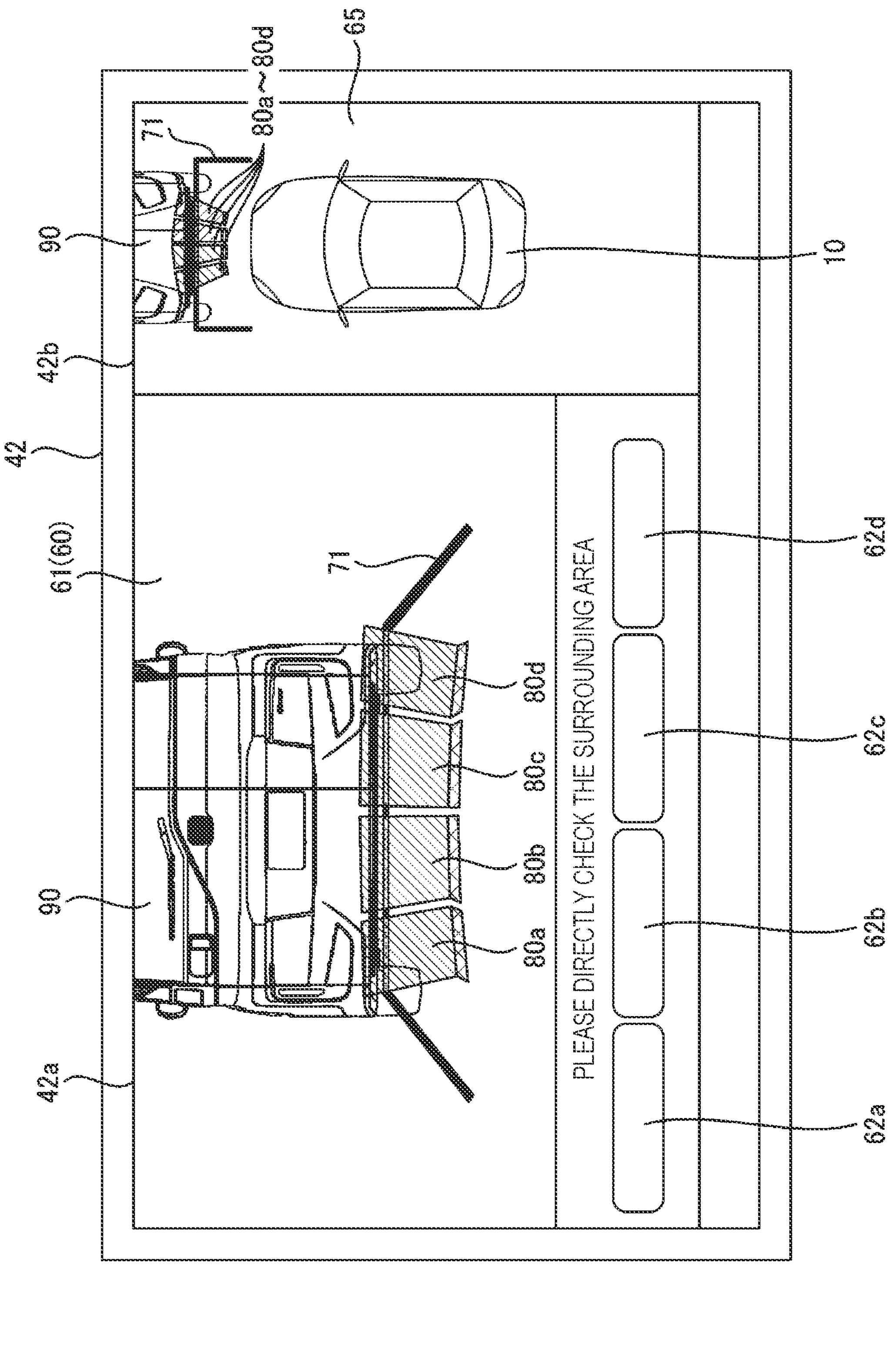
FIG. 9 shows a display mode of a moving guide and a stop guide displayed on a touch panel of a vehicle according to the present disclosure.

FIG. 9 shows a display mode of the moving guide and the stop guide displayed by the display control unit 56 in a superimposed manner on the front recognition image 61 (the external environment recognition image 60) and the top view image 65 when the distance between the vehicle 10 and the other vehicle 90 is less than a certain distance.

As shown in FIG. 9, when the distance between the vehicle 10 and the other vehicle 90 is less than a certain distance, the display control unit 56 displays a moving guide 71 and the four stop guides 80*a* to 80*d* in a superimposed manner on the front recognition image 61 and the top view image 65. The four stop guides 80*a* to 80*d* are the same as the stop guides described in FIG. 7.

When both the moving guide 71 and the stop guides 80*a* to 80*d* are displayed in a superimposed manner on the front recognition image 61 and the top view image 65, the display control unit 56 sets the transmittance of the moving guide 71 in an area in which the moving guide 71 and the stop guides 80*a* to 80*d* are displayed in an overlapping manner to be higher than the transmittance of the moving guide 71 in an area in which the moving guide 71 and the stop guides 80*a* to 80*d* do not overlap each other.

Figure 10:
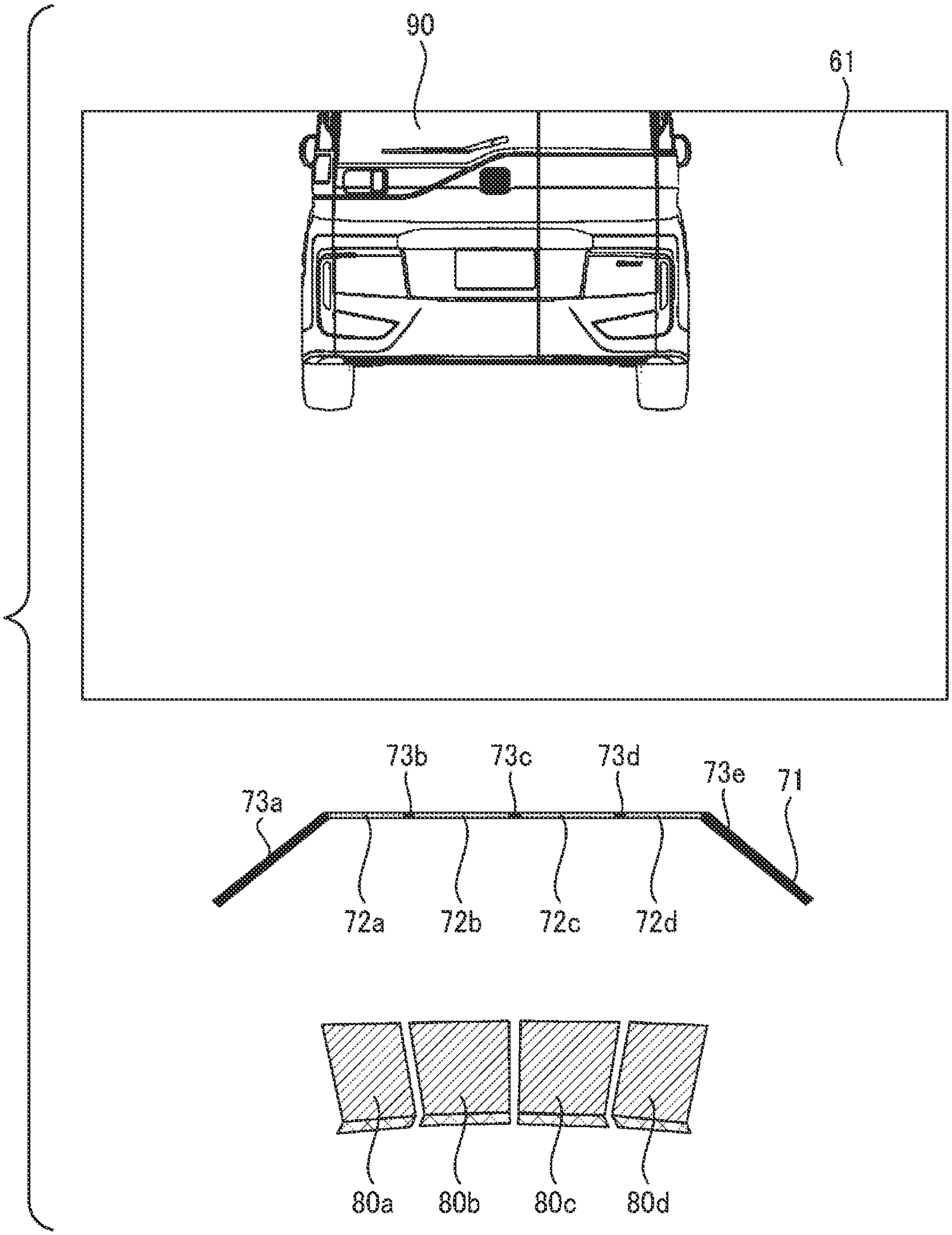
FIG. 10 is a diagram in which a front recognition image, the moving guide, and the stop guide displayed in FIG. 9 are separately displayed.

FIG. 10 is a diagram in which the front recognition image 61, the moving guide 71, and the stop guides 80*a* to 80*d* displayed in the first display area 42*a* in FIG. 9 are separately displayed. As shown in FIG. 10, the display control unit 56 sets a transmittance of overlapping areas 72*a* to 72*d* in which the stop guides 80*a* to 80*d* are displayed in an overlapping manner on the moving guide 71 to, for example, 50%, and sets a transmittance of non-overlapping areas 73*a* to 73*e* in which the stop guides 80*a* to 80*d* are not displayed in an overlapping manner on the moving guide 71 to, for example, 0% (opaque). The moving guide 71 and the stop guides 80*a* to 80*d* in FIGS. 9 and 10 correspond to the moving guide and the stop guide displayed in a superimposed manner in step S15 in FIG. 4.

Accordingly, even when the stop guides 80*a* to 80*d* are disposed on the front side (the other vehicle 90 side) of the moving guide 71, the area of the stop guides 80*a* to 80*d* overlapping the moving guide 71 can be recognized through the moving guide 71. In addition, when the moving guide 71 overlaps the other vehicle 90, the other vehicle 90 can be recognized through the moving guide 71.

As described above, the display control unit 56 of the calculation unit 52 sets the transmittance of the moving guide 71 to be higher in a case where the moving guide 71 and the stop guides 80*a* to 80*d* are superimposed on the front recognition image 61 and the top view image 65 than in a case where only the moving guide 71 among the moving guide 71 and the stop guides 80*a* to 80*d* is superimposed on the front recognition image 61 and the top view image 65. According to this configuration, by increasing the transmittance of the moving guide 71, visibility of the stop guides 80*a* to 80*d* can be improved, and discomfort in an appearance of the moving guide 71 can be prevented, for example, the moving guide 71 can be prevented from being viewed as an unnatural image as if the moving guide 71 is floating in the air, and it is possible to appropriately park the vehicle 10.

In addition, the display control unit 56 sets the transmittance of the area of the moving guide 71 overlapping the stop guides 80*a* to 80*d* to be higher than the transmittance of the area of the moving guide 71 not overlapping the stop guides 80*a* to 80*d*. Accordingly, the visibility of the stop guides 80*a* to 80*d* is improved while securing visibility of the area of the moving guide 71 that does not overlap the stop guides 80*a* to 80*d* as usual, discomfort in appearance of the moving guide 71 can be prevented, and it is possible to appropriately park the vehicle 10.

In addition, the display control unit 56 displays the moving guide 70 in a superimposed manner on the front recognition image 61 and the top view image 65 based on at least one of the instruction operation performed by the user of the vehicle 10, the movement speed of the vehicle 10, and the current position of the vehicle 10. Accordingly, the moving guide 70 can be displayed at appropriate timing when it is necessary to intensively check the surrounding area of the vehicle 10, and it is possible to appropriately park the vehicle 10.

In addition, the display control unit 56 displays the stop guides 80*a* to 80*d* in a superimposed manner on the front recognition image 61 and the top view image 65 based on approach of the other vehicle 90 (obstacle) to the host vehicle 10. According to this configuration, since the stop guides 80*a* to 80*d* are displayed in a superimposed manner on the moving guide 71, it is possible to prevent in advance a situation in which the other vehicle 90 (obstacle) and the host vehicle 10 come into contact with each other, and it is further possible to appropriately park the vehicle 10.

In addition, when the moving guide 71 and the stop guides 80*a* to 80*d* are superimposed on the front recognition image 61 and the top view image 65, the display control unit 56 sets the transmittance of the area of the moving guide 71 overlapping the stop guides 80*a* to 80*d* based on a selection of the user. Accordingly, since the user can select the transmittance of the moving guide in cases where appearances of the guide are different (difficult to see, easy to see) to the user, the visibility of the stop guides 80*a* to 80*d* can be improved, discomfort in the appearance of the moving guide 71 can be prevented, and it is further possible to appropriately park the vehicle 10.

Although the embodiment of the present disclosure is described above, the present disclosure is not limited to the above embodiment, and modifications, improvements, and the like can be made as appropriate.

For example, although the case where the vehicle 10 is parked is described in the above embodiment, the same control can be performed when the vehicle 10 exits.

The control method described in the above embodiment can be implemented by executing a control program prepared in advance on a computer. The control program is recorded in a computer-readable storage medium and is executed by being read from the storage medium. In addition, the control program may be provided in a form stored in a non-transitory storage medium such as a flash memory or may be provided via a network such as the Internet. The computer that executes the control program may be provided in a control device, may be provided in an electronic device such as a smartphone, a tablet terminal, or a personal computer capable of communicating with the control device or may be provided in a server device capable of communicating with the control device and the electronic device.

In addition, at least the following matters are described in the present specification. Although corresponding constituent elements and the like in the above embodiment are shown in parentheses, the present disclosure is not limited thereto.

(1) A control device including:

an external environment recognition unit (external environment recognition unit 55) configured to obtain an external environment recognition image (external environment recognition image 60) representing a recognition result of a surrounding area of a moving body (vehicle 10); and a display control unit (display control unit 56) configured to display the external environment recognition image on a display device (touch panel 42), in which the display control unit is configured to:

enables displaying of a moving guide (moving guides 70 and 71) representing a predetermined position in a traveling direction of the moving body and a stop guide (stop guides 80*a* to 80*d*) representing a position where movement of the moving body is to be stopped on the display device in a superimposed manner on the external environment recognition image; and set a transmittance of the moving guide to be higher in a case where the moving guide (moving guide 71) and the stop guide are superimposed on the external environment recognition image than in a case where only the moving guide (moving guide 70) among the moving guide and the stop guide is superimposed on the external environment recognition image.

According to (1), visibility of the stop guide can be improved, discomfort in an appearance of the moving guide (for example, the moving guide appears to float in the air when viewed by a person) can be prevented, and it is possible to improve safety of the moving body.

(2) The control device according to (1), in which the display control unit is configured to set a transmittance of an area (overlapping areas 72*a* to 72*d*) of the moving guide overlapping the stop guide to be higher than a transmittance of another area (non-overlapping areas 73*a* to 73*e*) of the moving guide.

According to (2), the visibility of the stop guide can be improved, the discomfort in the appearance of the moving guide can be prevented, and the area other than the overlapping area in the moving guide can be visually recognized as usual, and it is possible to improve the safety of the moving body.

(3) The control device according to (1) or (2), in which the display control unit is configured to superimpose the moving guide on the external environment recognition image based on at least one of an instruction operation performed by a user of the moving body, a movement speed of the moving body, and a position of the moving body.

According to (3), the safety of the moving body can be improved.

(4) The control device according to any one of (1) to (3), further including:

an obstacle recognition unit (obstacle recognition unit 57) configured to recognize an obstacle in the surrounding area of the moving body, in which the display control unit is configured to superimpose the stop guide on the external environment recognition image based on approach of the obstacle to the moving body.

According to (4), it is possible to prevent in advance a situation in which the obstacle and the moving body come into contact with each other, and it is possible to improve the safety of the moving body.

(5) The control device according to any one of (1) to (4), in which a transmittance of the moving guide when the moving guide and the stop guide are superimposed on the external environment recognition image is selectable by the user.

According to (5), since the user can select the transmittance in cases where appearances are different (difficult to see, easy to see) to the user, the visibility of the stop guide can be improved, discomfort in the appearance of the moving guide can be prevented, and it is possible to improve the safety of the moving body.

(6) A control method performed by a control device, the control method including:

obtaining an external environment recognition image representing a recognition result of a surrounding area of a moving body; and displaying the external environment recognition image on a display device, in which the control method further includes:

enabling displaying of a moving guide representing a predetermined position in a traveling direction of the moving body and a stop guide representing a position where movement of the moving body is to be stopped on the display device in a superimposed manner on the external environment recognition image, and setting a transmittance of the moving guide to be higher in a case where the moving guide and the stop guide are superimposed on the external environment recognition image than in a case where only the moving guide among the moving guide and the stop guide is superimposed on the external environment recognition image.

According to (6), the visibility of the stop guide can be improved, the discomfort in the appearance of the moving guide (for example, the moving guide appears to float in the air when viewed by a person) can be prevented, and it is possible to improve the safety of the moving body.

(7) A non-transitory computer-readable recording medium storing a control program for causing a processor of a control device to execute processing, the processing including:

obtaining an external environment recognition image representing a recognition result of a surrounding area of a moving body; and displaying the external environment recognition image on a display device, in which the processing further includes:

enabling displaying of a moving guide representing a predetermined position in a traveling direction of the moving body and a stop guide representing a position where movement of the moving body is to be stopped on the display device in a superimposed manner on the external environment recognition image, and setting a transmittance of the moving guide to be higher in a case where the moving guide and the stop guide are superimposed on the external environment recognition image than in a case where only the moving guide among the moving guide and the stop guide is superimposed on the external environment recognition image.

According to (7), the visibility of the stop guide can be improved, the discomfort in the appearance of the moving guide (for example, the moving guide appears to float in the air when viewed by a person) can be prevented, and it is possible to improve the safety of the moving body.

The invention claimed is:

1. A control device comprising circuitry configured to:

obtain an external environment recognition image representing a recognition result of a surrounding area of a moving body; and display the external environment recognition image on a display device, wherein the circuitry is further configured to:

enable displaying of a moving guide representing a predetermined position in a traveling direction of the moving body and a stop guide representing a position where movement of the moving body is to be stopped on the display device in a superimposed manner on the external environment recognition image; and set a transmittance of the moving guide to be higher in a case where the moving guide and the stop guide are superimposed on the external environment recognition image than in a case where only the moving guide among the moving guide and the stop guide is superimposed on the external environment recognition image.

2. The control device according to claim 1, wherein the circuitry is configured to set a transmittance of an area of the moving guide overlapping the stop guide to be higher than a transmittance of another area of the moving guide.

3. The control device according to claim 1, wherein the circuitry is configured to superimpose the moving guide on the external environment recognition image based on at least one of an instruction operation performed by a user of the moving body, a movement speed of the moving body, and a position of the moving body.

4. The control device according to claim 1, wherein the circuitry is further configured to:

recognize an obstacle in the surrounding area of the moving body; and superimpose the stop guide on the external environment recognition image based on approach of the obstacle to the moving body.

5. The control device according to claim 1, wherein a transmittance of the moving guide when the moving guide and the stop guide are superimposed on the external environment recognition image is selectable by the user.

6. A control method performed by a control device, the control method comprising:

obtaining an external environment recognition image representing a recognition result of a surrounding area of a moving body; and displaying the external environment recognition image on a display device, wherein the control method further comprises:

enabling displaying of a moving guide representing a predetermined position in a traveling direction of the moving body and a stop guide representing a position where movement of the moving body is to be stopped on the display device in a superimposed manner on the external environment recognition image; and setting a transmittance of the moving guide to be higher in a case where the moving guide and the stop guide are superimposed on the external environment recognition image than in a case where only the moving guide among the moving guide and the stop guide is superimposed on the external environment recognition image.

7. A non-transitory computer-readable recording medium storing a control program for causing a processor of a control device to execute processing, the processing comprising:

obtaining an external environment recognition image representing a recognition result of a surrounding area of a moving body; and displaying the external environment recognition image on a display device, wherein the processing further comprises:

enabling displaying of a moving guide representing a predetermined position in a traveling direction of the moving body and a stop guide representing a position where movement of the moving body is to be stopped on the display device in a superimposed manner on the external environment recognition image; and setting a transmittance of the moving guide to be higher in a case where the moving guide and the stop guide are superimposed on the external environment recognition image than in a case where only the moving guide among the moving guide and the stop guide is superimposed on the external environment recognition image.

* * * * *